United States Patent [19]

Hodges et al.

[11] Patent Number: 5,600,859
[45] Date of Patent: Feb. 11, 1997

[54] DOCK LEVELER IN WHICH THE RAMP IS RAISED AND LOWERED USING AN INFLATABLE MEMBER AND METHOD OF USE

[75] Inventors: Charles H. Hodges, Ruxton, Md.; Martin P. Hageman, Mequon; Monroe Mulder, Glendale, both of Wis.

[73] Assignee: Kelley Company, Inc., Milwaukee, Wis.

[21] Appl. No.: 380,956

[22] Filed: Jan. 31, 1995

[51] Int. Cl.$^6$ ........................................ E01D 1/00
[52] U.S. Cl. ............................ 14/71.1; 14/71.3; 14/71.7; 254/1; 254/93 HP
[58] Field of Search ...................... 14/71.1, 71.3, 14/71.5, 71.7; 254/1, 89 H, 89 R, 93 HP

[56] References Cited

U.S. PATENT DOCUMENTS

| 2,495,092 | 1/1950 | Cox et al. | |
|---|---|---|---|
| 2,610,824 | 9/1952 | Grier . | |
| 2,804,118 | 8/1957 | Bayerkohler . | |
| 3,012,804 | 12/1961 | Jeavons . | |
| 3,117,332 | 1/1964 | Kelley et al. . | |
| 3,211,425 | 10/1965 | Greulich et al. . | |
| 3,521,861 | 7/1970 | Freudenthal et al. . | |
| 3,528,118 | 9/1970 | Smith . | |
| 3,659,899 | 5/1972 | Phillips et al. | 298/22 R |
| 3,711,157 | 1/1973 | Smock | 293/8 R |
| 4,012,804 | 3/1977 | Catlett | 14/71.3 |
| 4,081,874 | 4/1978 | Artzberger | 14/71.7 |
| 4,293,969 | 10/1981 | Frommelt | 14/71.1 |
| 4,343,058 | 8/1982 | Loblick | 14/71.7 |
| 4,572,579 | 2/1986 | Saito | 298/1 A |
| 4,688,760 | 8/1987 | Garman et al. | 254/93 HP |
| 4,786,032 | 11/1988 | Garman et al. | 254/93 HP |
| 4,955,923 | 9/1990 | Hageman | 14/71.7 |
| 5,042,103 | 8/1991 | Megens | 14/71.7 |

FOREIGN PATENT DOCUMENTS

| 0386850 | 9/1990 | European Pat. Off. . |
|---|---|---|
| 835142 | 5/1960 | United Kingdom . |
| WO-A-93 13267 | 7/1993 | WIPO . |

Primary Examiner—Henry A. Bennett
Assistant Examiner—Pamela A. O'Connor
Attorney, Agent, or Firm—Michael, Best & Friedrich

[57] ABSTRACT

A dock leveler including a ramp movable between a raised position and a lowered position is moved to its raised position by inflation of an inflatable member, such as an airbag supported beneath the ramp by a support assembly. The support assembly is removably mounted below the ramp at its rearward end, and its forward end is provided with wheels which engage the floor of the pit within which the dockleveler is mounted. A fan is mounted to the support adjacent its rearward end, and includes an outlet communicating through the support with the interior of the airbag. The airbag, support and fan are assembled into a subassembly which is removable as a unit from below the ramp. A lifting tool is employed to raise the forward end of the support assembly, either for cleaning or for use in mounting a pair of auxiliary wheel assemblies to the support assembly. The auxiliary wheel assemblies are employed to disengage the airbag, support and fan subassembly from the dock leveler and to facilitate withdrawal of the subassembly for servicing or the like.

26 Claims, 4 Drawing Sheets

DOCK LEVELER IN WHICH THE RAMP IS RAISED AND LOWERED USING AN INFLATABLE MEMBER AND METHOD OF USE

BACKGROUND AND SUMMARY OF THE INVENTION

This invention relates to a dock leveler used to bridge the gap between a loading dock and the bed of a truck or carrier parked adjacent the loading dock, and more particularly to improvements in dock levelers incorporating an airbag or other inflatable member for raising the ramp of the dock leveler.

A dock leveler typically includes a frame or supporting structure mounted in a pit or depression in the loading dock. The rear end of a ramp or deck plate is pivotably mounted to the supporting structure so that the ramp is movable between an inclined position in which the ramp is supported by the truck bed, a horizontal inoperative position, and a raised position in which the forward end of the ramp is raised above the truck bed.

An extension lip is pivotably mounted to the forward end of the ramp, and is movable between a downwardly hanging pendant position and an extended position in which the lip forms an extension to the ramp.

After a truck has parked in front of the loading dock in preparation for a loading or unloading operation, the ramp of the dock leveler is raised to its upwardly inclined position. As the ramp is lowered, the lip is pivoted outwardly to its extended position. As the ramp is subsequently lowered, the lip engages the bed of the truck to support the ramp, such that the ramp and the lip in combination bridge the gap between the loading dock and the truck bed. After the loading or unloading operation is completed, the ramp is raised and the lip falls by gravity to its pendant position. The ramp is then lowered to its horizontal position, and the truck can then pull away from the loading dock.

In the past, the ramp has been pivoted to its upward position in response to operation of a mechanical or hydraulic mechanism. However, recent developments in the dock leveler art disclose an inflatable member or bag utilized to pivot the ramp to its upwardly inclined position, such as is illustrated in copending U.S. patent applications Ser. No. 08/131,983 filed Oct. 4, 1993 and Ser. No. 08/131,988 filed Oct. 4, 1993. These applications disclose a bag inflated with low pressure air by an inflating device such as a fan or blower, and are hereby incorporated by reference.

The present invention is directed to improvements in a dock leveler, and more particularly to improvements providing advantageous construction, operation and servicing of a dock leveler incorporating an inflatable member for raising the ramp between its raised and lowered positions.

In accordance with one aspect of the invention, the inflatable member is mounted to a support disposed below the ramp and the inflating device, such as a fan or blower, is likewise mounted to the support. The lower portion of the inflatable member is supported by an upwardly facing surface defined by the support, and the inflating device is mounted to a downwardly facing surface defined by the support. An opening is formed in the support, and the inflating device communicates with the interior of the inflatable member through the opening. The support defines a forward end and a rearward end, and the rearward end of the support is mounted below the ramp so as to be raised above the pit floor. The forward end of the support is lowered relative to the rearward end, and is preferably engaged with the pit floor. The fan is mounted adjacent the raised rearward end of the support, so as to elevate the fan above the pit floor. In a preferred form, the rearward end of the support is removably mounted below the ramp via a mounting arrangement in which engagement of the support is released by upward movement of the rearward end of the support. One or more wheels are located adjacent the forward end of the support and are engageable with the pit floor. The support, inflatable member and inflating device are removable as a unit from the dock leveler by disengaging the rearward end of the support from the dock leveler and drawing the support, inflatable member and fan forwardly as a removable subassembly. This feature provides relatively quick and easy removal of the support, inflatable member and inflating device, to facilitate servicing and/or replacement of such components.

In accordance with another aspect of the invention, a selectively actuable lifting device, preferably but not necessarily in the form of an inflatable member, is employed for selectively moving the ramp to its raised position from its lowered position. The lifting device is supported by a support having forward and rearward ends. The lifting device support is raised in order to facilitate access to the rearward portion of the pit by pivotably mounting the rearward end of the lifting device support above the pit floor, engaging a lifting tool in an engaging position with the lifting device support adjacent its forward end, and moving the lifting tool to an operative lifting position in which a portion of the lifting tool is disposed between the forward end of the lifting device support and the pit floor. In this manner, the forward end of the lifting device support is raised above the pit floor, and the lifting device support is pivoted about the pivotable connection of the lifting device support rearward end. The lifting tool includes a first section engageable with the forward end of the lifting device support, and a second section interconnected with the first section and engageable with the pit floor when the lifting tool is in its operative lifting position. One or more wheels are interposed between the first and second sections of the lifting tool. In one form, the lifting device support includes one or more wheels mounted to a transverse axle, and the step of engaging the lifting tool with the lifting device support is carried out by engaging the lifting tool with the axle. The lifting tool first section is arranged relative to the lifting tool second section such that, when the lifting tool is in its operative lifting position, the point of engagement of the lifting tool with the lifting device support is located forwardly of the wheel, between the wheel and the point of engagement of the lifting tool second section with the pit floor. This provides a stable structure for maintaining the lifting device support in its raised position until removal of the lifting tool.

In accordance with another aspect of the invention, the rear end of the lifting device support is removably and pivotably mounted below the ramp via a mounting arrangement in which engagement of the lifting device support is released upon upward movement of the rearward end of the lifting device support. One or more wheels are mounted toward the forward end of the lifting device support and the forward end of the lifting device support is raised, either by the structure and method set forth in the preceding paragraph or in any other satisfactory manner. After raising of the lifting device support, one or more second, auxiliary wheels are mounted to or otherwise positioned on the lifting device support. The auxiliary wheels are mounted at an elevation below the first-mentioned wheels. The lifting device support is then lowered to engage each auxiliary wheel with a rolling surface, which could be the pit floor but which preferably is an upwardly facing surface defined by longitudinal front-to-rear extending side frame members located above the pit floor, such that the first-mentioned wheels are located thereabove. A downward force is then exerted toward the forward end of the lifting device support while the auxiliary wheels are engaged with the rolling surface, to cause an upward movement of the rearward end of the lifting device support to release engagement of the lifting device support. The lifting device support is then removed by exerting a forward force on the lifting device support while maintaining engagement of the auxiliary wheels with the rolling surface. As before, the lifting device is preferably in the form of an inflatable member mounted to the support, and an inflating device is also mounted to the support such that removal of the support results in simultaneous removal of the inflatable member and the inflating device. The step of removably and pivotably mounting the lifting device support below the ramp is carried out by engaging a pin provided toward the rearward end of the support within an upwardly facing recess formed in a depending member extending downwardly from the ramp. The step of raising the forward end of the lifting device support is preferably carried out as set forth in the preceding paragraph, by engaging a lifting tool with the forward end of the lifting device support and moving the lifting tool to an operative lifting position to raise the forward end of the support. The step of mounting one or more auxiliary wheels to the support is preferably carried out by providing one or more auxiliary wheel assemblies, each of which includes a mounting plate having an upper end and a lower end to which an auxiliary wheel is mounted, and removably mounting the upper end of each mounting plate to the lifting device support.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figures 1, 2:
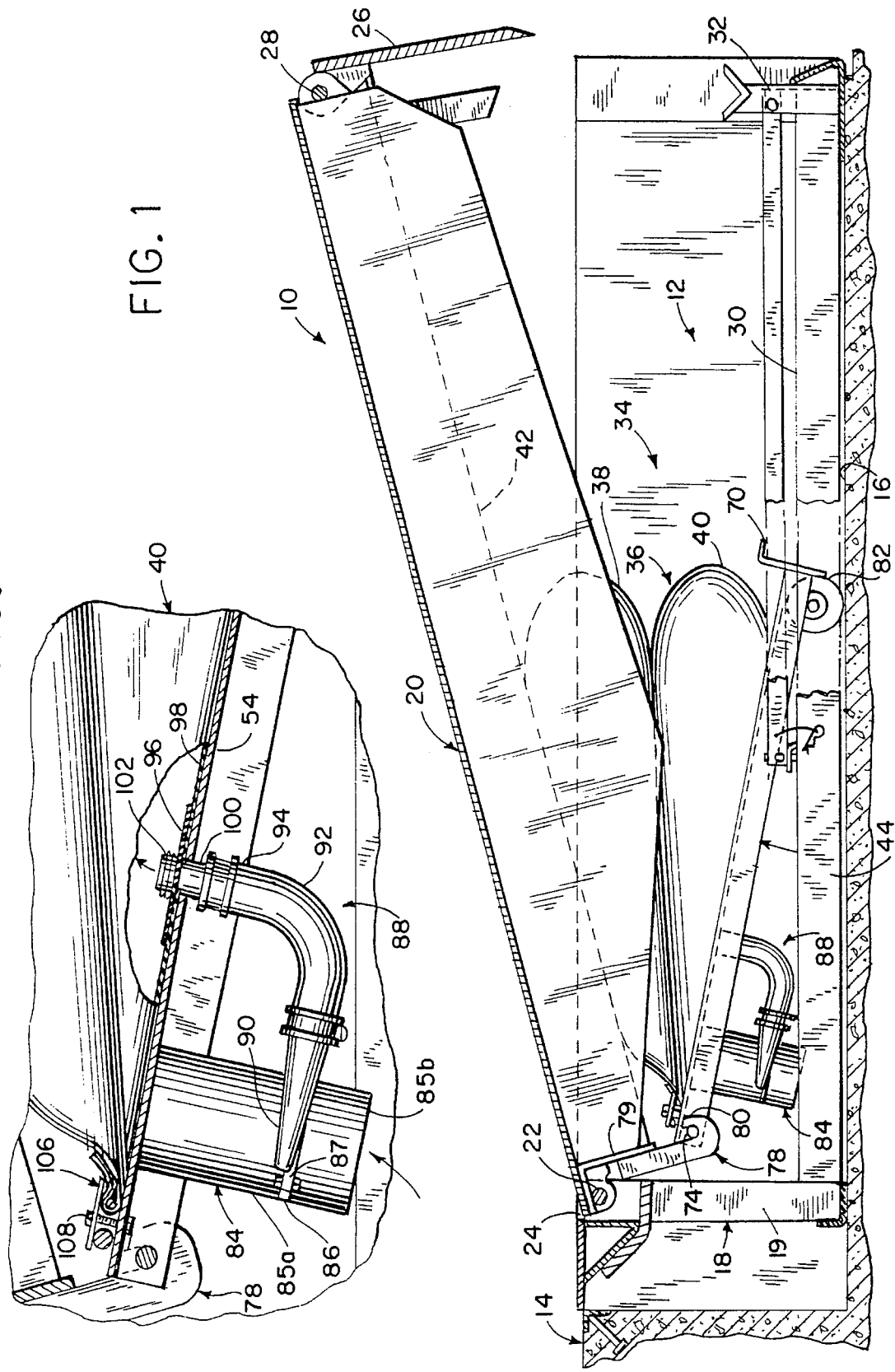
FIG. 1 is a longitudinal section view of a dock leveler constructed according to the invention, illustrating the ramp in its upwardly inclined raised position.
FIG. 2 is a partial section view of the dock leveler of FIG. 1, with portions broken away, showing a portion of the inflatable member, the support and the inflating device subassembly.

Referring to FIG. 1, a dock leveler 10 is mounted in a pit or depression 12 in a loading dock 14. The lower surface or floor 16 of pit 12 preferably slopes downwardly and forwardly, in a conventional manner. Dock leveler 10 is adapted to bridge the gap between the upper surface of loading dock 14 and the bed of a truck or carrier parked in front of loading dock 14, to facilitate loading or unloading of the truck or carrier.

Dock leveler 10 includes a frame or supporting structure 18, which is mounted in pit 12, and the rear end of a ramp or deck plate 20 is pivotably mounted to the upper end of frame 18 via one or more pins 22, again in a conventional manner. Ramp 20 is movable between a generally horizontal stored, dock-level position, in which ramp 20 is flush and substantially coplanar with the upper surface of dock 14, and an upwardly inclined position, as shown in FIG. 1.

To pivotably mount ramp 20 to frame 18, a series of lugs 24, interconnected with ramp 20, are mounted to the upper ends of the vertical members 19 of frame 18 through pins 22.

An extension lip 26 is hinged to the forward end of ramp 20 by means of hinge pins 28. Extension lip 26 is pivotable from a downwardly hanging pendant position, as illustrated in FIG. 1, to an outwardly extending position (not shown), via a conventional lip extension mechanism which is actuated when ramp 20 is moved from its raised position to a lowered position. When lip 26 is moved to its outwardly extending position, lip 26 is coplanar with ramp 20, forming an extension to ramp 20. Lip 26 can be moved from its pendant position to its extended position and held in its extended position by various mechanical, hydraulic or pneumatic mechanisms, in a manner as is known, and the lip lifting and latching mechanism is not, in itself, a part of the present invention.

Frame 18 further includes a pair of spaced, forwardly-extending side members 30 located adjacent the sides of pit 12, and a pair of front support pads 32 mounted to the forward ends of side members 30. Side members 30 are preferably in the form of angle members, each defining an outer vertical section and lower horizontal sections spaced slightly above pit floor 16.

A lifting subassembly, shown generally at 34, is located in pit 12 beneath ramp 20. Lifting subassembly 34 consists of an inflatable member or bag assembly 36 including vertically superimposed upper and lower bags 38, 40, respectively. The construction of bag assembly 36 is illustrated and described in copending U.S. patent application Ser. No. 08/131,981 filed Oct. 4, 1993. Bags 38, 40 are preferably formed of any satisfactory air-impervious material, such as fabric coated with a thermoplastic resin, and have contiguous horizontal surfaces joined together via an annular seal enclosing an opening providing communication between bags 38, 40.

The upper surface of bag assembly 36, defined by the upper extent of upper bag 38, bears against a pressure plate (not shown) mounted to the undersides of a series of longitudinally extending beams 42, to which ramp 20 is mounted.

Figure 3:
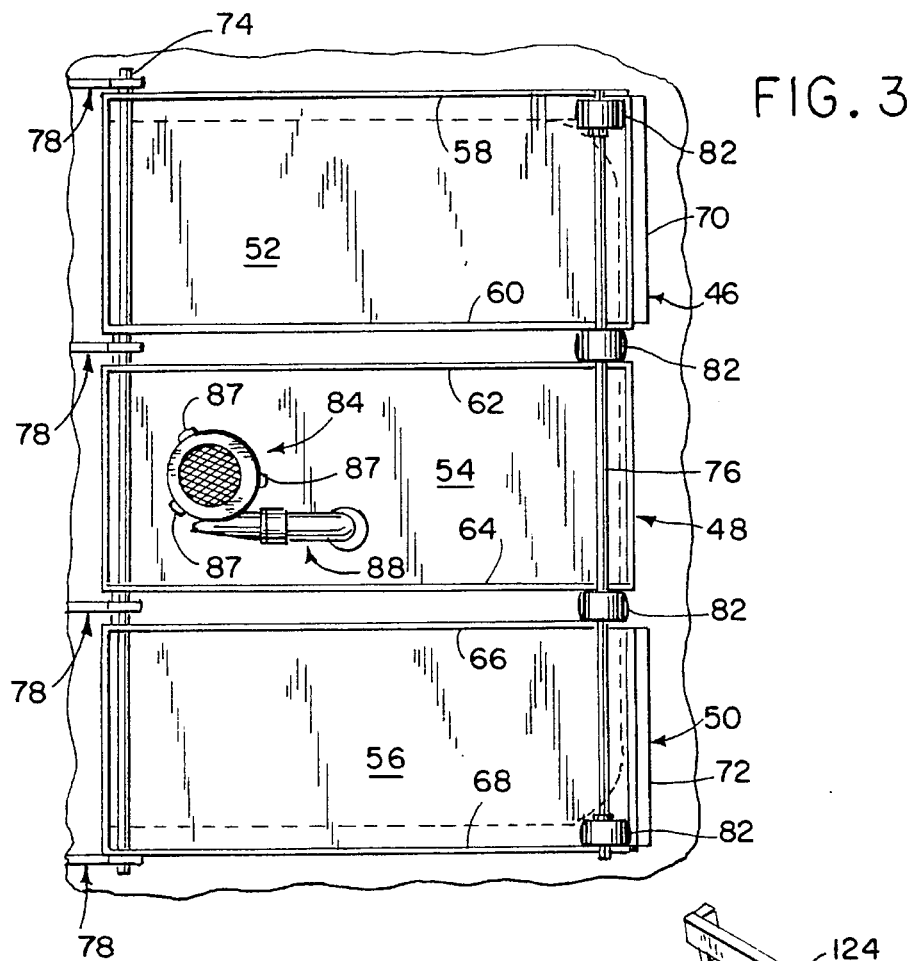
FIG. 3 is a bottom plan view of the subassembly illustrated in FIG. 2.

Bag assembly 36 is mounted to a bag support assembly 44 (FIGS. 1, 3), which as shown consists of three side-by-side sections 46, 48 and 50 (FIG. 3). Sections 46, 48 and 50 include upper support plates 52, 54 and 56, respectively, which have downturned side flanges 58, 60; 62, 64; and 66, 68, respectively. Front bumpers 70, 72, in the form of inverted L-shaped sections, are mounted to the forward ends of support sections 46 and 50.

A pin 74 extends through aligned openings located adjacent the rearward ends of flanges 58–68, and an axle 76 extends through aligned openings located toward the forward ends of flanges 58–68. Pin 74 and axle 76 function to secure support sections 46, 48 and 50 together.

Referring to FIGS. 1–3, pin 74 is removably engageable within upwardly facing slots formed in depending hook-type bracket members 78 mounted to a rear transverse angle member 79 located at the rearward ends of beams 42 below ramp 20. Each bracket member 78 includes an upwardly extending lip 80 at its lower, forward end defining the slot within which pin 74 is received. With this construction, the rearward end of support 44 is removable from engagement with brackets 78 via an upward movement of the rearward end of support 44.

A series of wheels 82 are mounted to axle 76. An outer pair of wheels are located adjacent flanges 58 and 68, and an inner pair of wheels 82 are located one between sections 46 and 48 adjacent flanges 60 and 62, respectively, and the other between sections 48 and 50 adjacent flanges 64 and 66, respectively. Wheels 82 are engageable with pit floor 16 so as to enable rolling movement of support 44 thereon. As shown in FIG. 1, when wheels 82 are engaged with pit floor 16 and when pin 74 is mounted within the slots in brackets 78, the rearward end of support 44 is elevated relative to the forward end.

A fan or blower assembly 84 is mounted to the lower surface of plate 54 of central section 48. Fan assembly 84 consists of an upper housing 85a and a lower housing 85b. A fan unit including a mounting ring 86 having a series of bosses 87 is secured between upper housing 85a and lower housing 85b, with the fan itself being disposed within upper housing 85a and its inlet and a filter being disposed within lower housing 85b. Fan assembly 84 is electrically operated, and includes a conventional cord engageable with an electrical outlet (not shown) for providing power to fan assembly 84.

As shown in FIG. 2, an air pipe assembly 88, consisting of a fan outlet section 90 formed integrally with ring 86, a flexible elbow 92 and a discharge section 94, is mounted between the fan assembly 84 and the interior of lower airbag 40. Fan outlet section 90 receives pressurized air from fan assembly 84, which is then transferred through elbow 92 and discharge section 94 into lower airbag 40 and subsequently into upper airbag 38.

While fan assembly 84 is shown mounted to support 44, it is understood that fan 84 could be mounted in any other location, such as between beams 42. Alternatively, it is understood that air from a pressurized, regulated air source, such as compressed shop air, could be used in place of fan assembly 84.

Referring to FIG. 2, a flexible elastomeric reinforcing ring 96 is secured such as by heat sealing, to the lower wall 98 of lower airbag 40, and ring 96 includes a central opening overlying the inlet opening formed in airbag lower wall 98. A nipple 100 having barbs 102 is connected to the end of discharge section 94 and extends through the aligned openings formed in plate 54, bag lower wall 98 and ring 96. Barbs 102 are engageable with reinforcing ring 96 so as to securely mount bag assembly 34 to discharge pipe assembly 88.

Bag assembly 34 is secured to support sections 46, 48 and 50 using a clamp bar 106 (FIG. 2), which is secured via bolts 108 and associated nuts to plates 52, 54 and 56, after bag reinforcing ring 96 is secured to outlet 102 using a downward push-on motion forcing ring 96 over the ribs of outlet 102.

With the construction as illustrated in FIGS. 1–3, lifting assembly 34, consisting of bag assembly 36, bag support 44 and fan assembly 84, is removable as a unit from dock leveler 10, to facilitate servicing and/or replacement of such components. This arrangement substantially simplifies construction of dock leveler 10 by enabling the airbag, support and fan subassembly to be assembled separately from the other components of dock leveler 10. Further, a very short run of piping is necessary to communicate pressurized air from fan assembly 84 to airbag assembly 36, which again simplifies manufacture and minimizes the amount of pressure loss through the piping.

Figure 4:
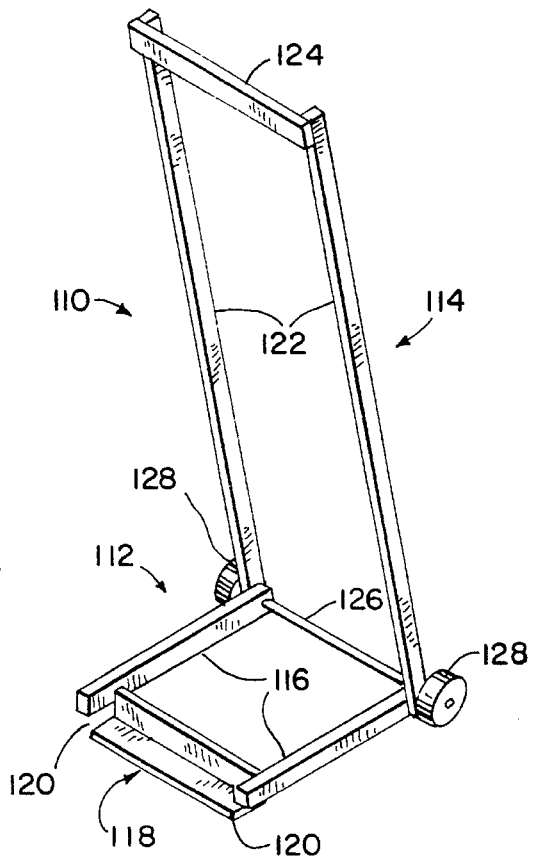
FIG. 4 is an isometric view of a lifting tool for raising the forward end of the lifting device support above the supporting surface to a raised position.

The invention further contemplates a lifting tool 110 (FIG. 4) which is adapted for use in raising the forward end of airbag support 44. Lifting tool 110 includes a lower lifting section 112 and a lever or lifting handle section 114. Lower lifting section 112 includes a pair of lifting members 116 and a forward mounting member 118 in the form of an angle section mounted between the forward ends of lifting members 116. The lower flange of forward mounting member 118 is disposed in a plane parallel to the plane of the lower surfaces defined by lifting members 116 and is spaced therebelow, so as to define a pair of slots 120. Lever section 114 includes a pair of tube handle sections 122 connected at their upper ends via a cross-bar 124. The lower ends of tube handle sections 122 and the rearward ends of lifting members 116 are welded together. An axle 126 extends through aligned openings formed in tube handle sections 122 and lifting members 116, and wheels 128 are mounted to the ends of axle 126.

Lifting section 112 and lever section 114 cooperate to define an acute angle therebetween, preferably 70° to 80°.

Figure 5:
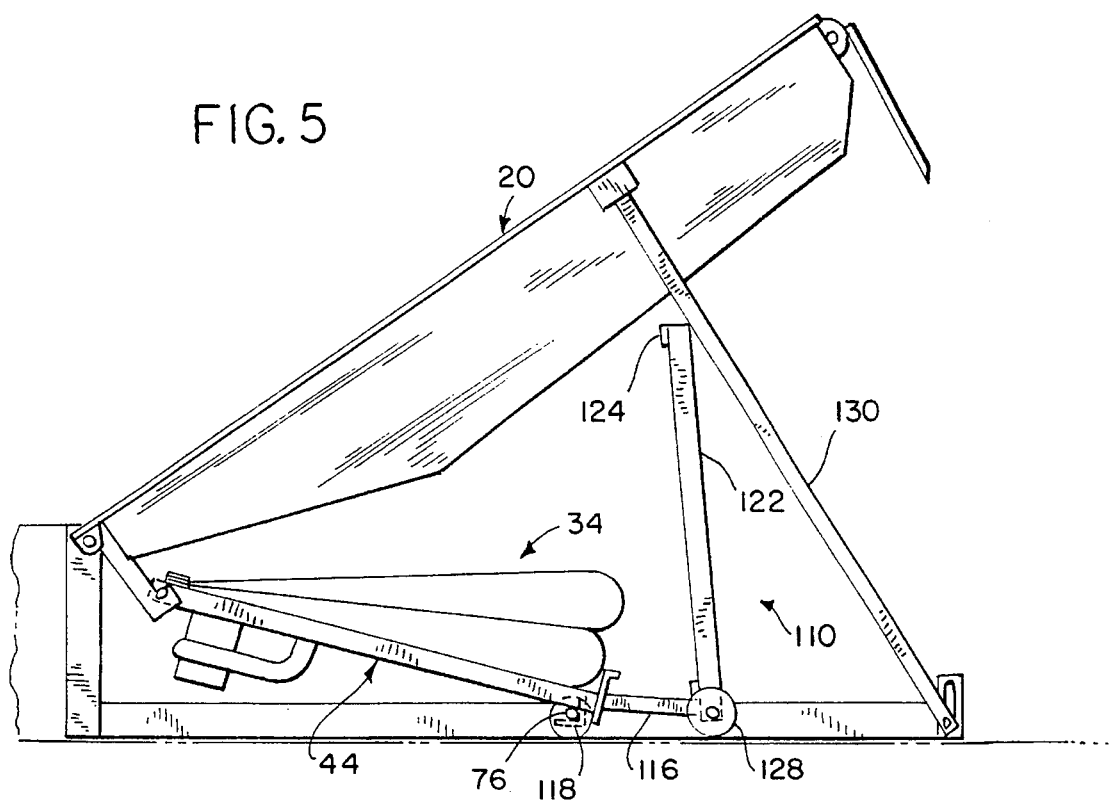
FIG. 5 is a schematic view of the dock leveler of FIG. 1 showing the lifting tool of FIG. 4 in an engaged, inoperative position.
Figure 6:
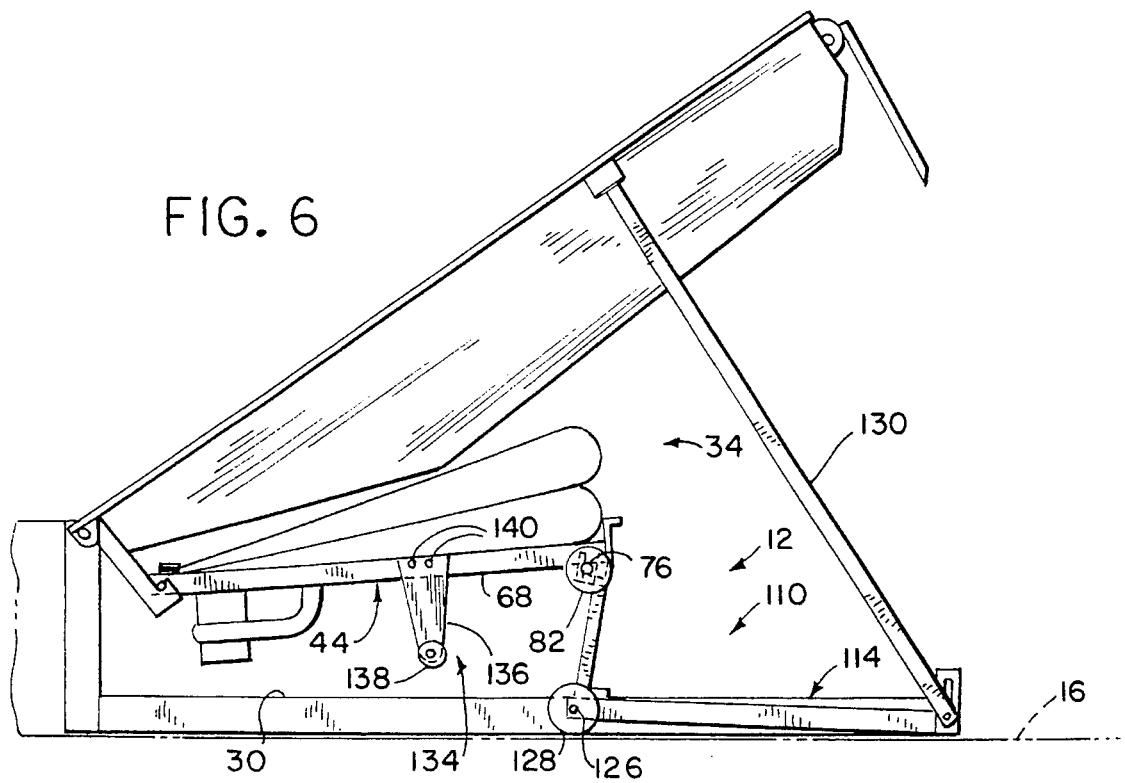
FIG. 6 is a view similar to FIG. 5, showing the lifting tool in its operative lifting position for raising the forward end of the lifting device support and showing mounting of the auxiliary wheels to the lifting device support.

Referring to FIGS. 5 and 6, lifting tool 110 is used to lift the forward end of airbag support 44 when the maintenance strut 130 of dock leveler 10 is in its operative position in which ramp 20 is raised upwardly to a maintenance position from its conventional at-rest position, in accordance with conventional operation of a maintenance strut of this type. Lifting tool 110 is moved to an engaged position in which axle 76 is received within slots 120, with the lower flange of angle 118 being located below axle 76 and the forward bottom edges of lifting members 116 being located over axle 76. While maintaining such engagement of lifting section 112 with axle 76, the user exerts a downward and rearward force on handle section 114 by grasping upper cross-bar 124 and bringing handle section 114 to its FIG. 6 position in which the upper end of handle section 114 engages pit floor 16. During such movement of handle section 114, wheels 128 roll rearwardly on pit floor 16 to the position as shown in FIG. 6, in which the axle 126, to which wheels 128 are mounted, is located rearwardly of axle 76. This movement results in lifting members 116 raising axle 76, and thereby the forward end of support 44, to a raised position as shown in FIG. 6.

The geometry of lifting tool 110, in which axle 76 is located forwardly of lifting tool axle 126 when lifting tool handle section 114 is engaged with pit floor 16, enables the operator to leave lifting tool 110 in its FIG. 6 position to maintain the front end of support 44 in its raised position. The weight of support 44, airbag assembly 34 and fan 84 exerts a downward force on wheels 128 and the forward end of handle section 114 to maintain lifting tool 110 in its operative lifting position, without assistance from the operator. The operator is then free to clean the rearward portion of pit 12 below support 44, such as by using a broom or by spraying water, or by another other satisfactory method. After use, lifting tool 110 is returned to its FIG. 5 position and removed for subsequent operation of dock leveler 10.

Figure 8:
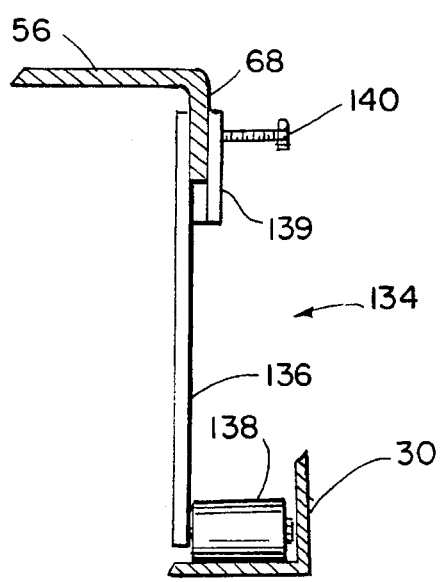
FIG. 8 is a partial section view taken along line 8—8 of FIG. 7.

Alternatively, while lifting tool 110 is in its operative lifting position of FIG. 6, and if the operator desires to remove support 44 for servicing of airbag assembly 34, fan assembly 84 or support 44, the operator mounts a pair of auxiliary wheel assemblies 134 to flanges 58 and 68. Each auxiliary wheel assembly 134 consists of a mounting plate 136 having a wheel 138 rotatably mounted to its lower end, and having an upper clamping plate 139 mounted to its upper end. Clamping plate 136 includes a threaded opening which receives the threaded shank of a bolt 140 (FIG. 8). Bolt 140 engages flange 46 of support 44 to clamp flange 68 between the end of bolt 140 and the upper end of mounting plate 136. In this manner, auxiliary wheel assemblies 134 are temporarily secured to flanges 58, 68.

Mounting plate 136 of each auxiliary wheel assembly 134 is constructed such that each auxiliary wheel 138 is located at an elevation below that of support wheels 82 when auxiliary wheel assemblies 134 are mounted to support 44. In this manner, when lifting tool 110 is moved from its operative lifting position of FIG. 6 back toward its engaging position of FIG. 5, auxiliary wheels 138 engage a rolling surface, which in this case is the lower flange of frame side members 30, and support wheels 82 are located above pit floor 16 and frame side members 30. Alternatively, it is understood that auxiliary wheels 138 may be constructed so as to engage pit floor 16.

Figure 7:
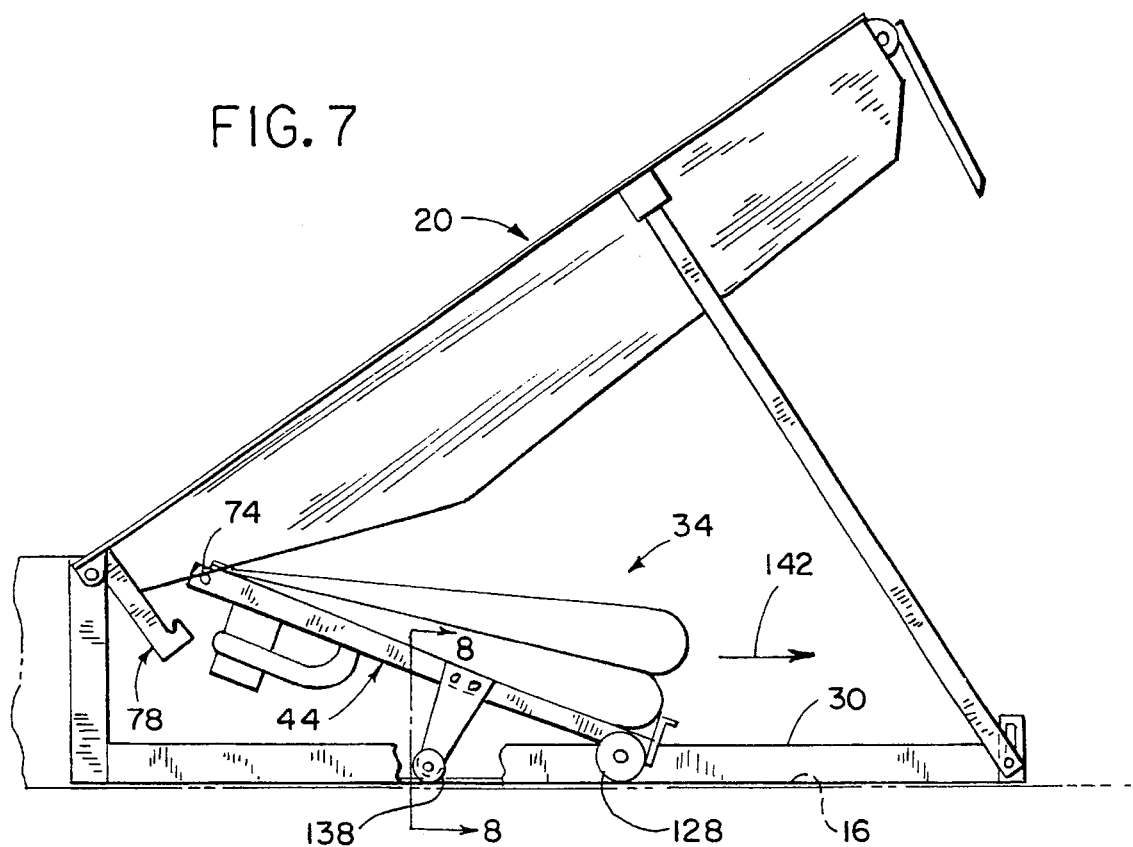
FIG. 7 is a view similar to FIGS. 5 and 6, showing removal of the lifting device support, the inflatable member and the inflating device using the auxiliary wheels mounted to the support.

The user then removes lifting tool 110, and exerts a downward force on the forward end of support 44 to pivot the rear end of support assembly 44 upwardly, as shown in FIG. 7, while maintaining engagement of auxiliary wheels 138 with frame side members 30. This downward movement of the forward end of support 44 and raising of the rearward end of support 44 disengages pin 74 from the slot in brackets 78. Engagement between dock leveler 10 and lifting subassembly 34 is then released, and the operator exerts a forward force in the direction of arrow 142 (FIG. 7) causing auxiliary wheels 138 to ride on frame side members 30 to withdraw subassembly 34 forwardly from below ramp 20. After the subassembly 34 has been serviced as required or if pit 12 has been serviced as necessary upon removal of subassembly 34, subassembly 34 is replaced by reversing the above steps. That is, subassembly 34 is moved rearwardly while maintaining auxiliary wheels 138 in engagement with frame side members 30, until pin 74 engages the forward surfaces of brackets 78. The operator then employs lifting tool 110 to raise the forward end of support 44 as shown in FIG. 6, wherein pin 74 rides on the forward surfaces of brackets 78 until pin 74 is received within the slot formed in brackets 78. While support 44 is in its raised position, auxiliary wheel assemblies 134 are removed from support 44, and lifting tool 110 is thereafter moved back to its FIG. 5 position and then withdrawn from below ramp 20. Ramp 20 is then once again moved to its raised position by operation of fan 84, and maintenance strut 130 is then replaced to its inoperative position as shown in FIG. 1. Dock leveler 10 is then again ready for operation.

It is understood that lifting tool 110 and auxiliary wheel assemblies 134 could be employed in connection with any type of lifting device support, and are not limited to use in connection with an airbag-type lifting arrangement. It is also understood that lifting tool 110 and auxiliary wheel assemblies 134 could be employed in an airbag-operated dock leveler in which fan 84 is in a location other than mounted to support 44.

Various alternatives and embodiments are contemplated as being within the scope of the following claims particularly pointing out and distinctly claiming the subject matter regarded as the invention.

We claim:

1. In a dock leveler including a pivotally mounted ramp movable between a raised position and a lowered position, the improvement comprising:

an inflatable member for moving the ramp to its raised position from its lowered position; and a support to which the inflatable member is mounted, said support being removably mounted under the ramp, such that said support is removable from below the ramp.

2. The improvement of claim 1, further comprising an opening provided in said support and interconnected with the inflatable member for enabling selective introduction of air into the inflatable member for raising the ramp.

3. The improvement of claim 2, further comprising an inflating device mounted to said support and having a pressurized air outlet in communication with the inflatable member.

4. The improvement of claim 1, wherein the dock leveler is disposed above a supporting surface, and wherein the support defines first and second ends, wherein the first end of the support is mounted below the ramp so as to be raised above the supporting surface, and wherein the second end of the support is lowered relative to the first end, and further comprising an inflating device in the form of a fan mounted adjacent the first end of the support.

5. The improvement of claim 4, in combination with a lifting tool for lifting the support second end and thereby raising the support to a raised position.

6. The improvement of claim 5, wherein the first end of the support is removeably mounted below the ramp via a mounting arrangement in which engagement of the support first end is released by upward movement of the support first end, and further in combination with one or more wheels located adjacent the support second end and engageable with the supporting surface.

7. The improvement of claim 6, in combination with one or more auxiliary wheels mountable on the support rearwardly of the first-mentioned wheels such that the one or more auxiliary wheels are located at an elevation below that of the first-mentioned wheels when the support is in its raised position.

8. A dock leveler, comprising:

a pivotable ramp movable between a raised position and a lowered position;

an inflatable member located below the ramp and engageable therewith for moving the ramp to its raised position from its lowered position;

a support to which the inflatable member is mounted, said support being removable from the dock leveler; and an inflating device mounted to the support and interconnected with the inflatable member for selectively inflating the inflatable member for moving the ramp to its raised position;

wherein the inflatable member, the support and the inflating device are assembled into a subassembly which is removable as a unit form below the ramp via the removable mounting of the support below the ramp.

9. In a dock leveler including a pivotably mounted ramp movable between a raised position and a lowered position, the improvement comprising:

an inflatable member for moving the ramp to its raised position from its lowered position;

a support located below the ramp to which the inflatable member is mounted, the support defining a forward end accessible from below the ramp when the ramp is in its raised position, and a rearward end spaced rearwardly from the forward end; and wherein the support is removably mounted below the ramp so as to enable the support to be withdrawn from below the ramp in a forward direction.

10. The improvement of claim 9, wherein the rearward end of the support is removably engaged with the dock leveler via mating removable connection structure interposed between the rearward end of the support and structure associated with the dock leveler below the ramp.

11. The improvement of claim 9, wherein the mating removable connection structure comprises a shaft mounted to the support and one or more hook members extending downwardly from the ramp adjacent its rearward end, each hook member defining an upwardly facing recess adapted to receive the shaft upon downward movement into the recess, wherein upward movement of the shaft disengages the rearward end of the support from the dock leveler.

12. The improvement of claim 11, in combination with one or more wheels located adjacent the forward end of the support and one or more auxiliary wheels mountable on the support rearwardly of the first-mentioned wheels such that the auxiliary wheels are disposed at an elevation below that of the first-mentioned wheels.

13. The improvement of claim 9, further comprising an inflating device mounted to the support and interconnected with the inflatable member for selectively inflating the inflatable member for raising the ramp, wherein the inflating device is removable from below the ramp upon withdrawal of the support.

14. For a dock leveler disposed over a supporting surface and including a ramp movable between a raised position and a lowered position, a selectively actuable lifting device located below the ramp for selectively moving the ramp to its raised position from its lowered position, and a lifting device support located below the ramp, the lifting device having first and second ends, a method of raising the lifting device support, comprising:

pivotably mounting the first end of the lifting device support above the supporting surface;

engaging a lifting tool in an engaging position with the lifting device support adjacent its second end; and moving the lifting tool to an operative lifting position in which a portion of the lifting tool is disposed between the second end of the lifting device support and the supporting surface for raising the second end of the lifting device support above the supporting surface and for causing pivoting movement of the lifting device support at the pivotable mounting of the first end of the lifting device support.

15. The method of claim 14, wherein the support defines an upper surface and a lower surface, and wherein the lifting device comprises an inflatable member mounted to the upper surface of the lifting device support, and further comprising an inflating device mounted to the lower surface of the lifting device support, wherein raising of the second end of the lifting device support above the supporting surface provides access to the area below the lifting device support.

16. The method of claim 14, wherein the lifting tool comprises a first section engageable with the second end of the lifting device support, a second section engageable with the supporting surface when the lifting tool is in its operative lifting position, and one or more wheels interposed between the first and second sections of the lifting tool.

17. The method of claim 16, wherein the lifting device support includes one or more wheels mounted to a transverse axle interconnected with the lifting device support adjacent its first end, and wherein the step of engaging the lifting tool with the lifting device support adjacent its second end comprises engaging the lifting tool with the axle.

18. The method of claim 16, wherein the lifting tool first section is disposed at an angle of less than 90° relative to the lifting tool second section such that, when the lifting tool second section is engaged with the supporting surface, engagement of the lifting tool first section with the lifting device support first end is located forwardly of the wheel between the first and second sections of the lifting tool.

19. The method of claim 14, wherein the lifting device support includes one or more wheels located adjacent its first end and wherein the lifting device support is removably mounted below the ramp via a removable mounting arrangement in which engagement of the lifting device support is released upon upward movement of the second end of the lifting device support, and further comprising the step of mounting one or more second wheels to the lifting device support while the lifting device support is raised such that the one or more second wheels are disposed below the elevation of the first-mentioned wheels, lowering the first end of the lifting device support by removal of the lifting tool so as to engage the one or more second wheels with a supporting surface, exerting a downward force on the first end of the lifting device support to raise the second end of the lifting device support to release engagement of the lifting device support below the ramp, and exerting a forward force on the lifting device support while maintaining the second wheels in contact with the supporting surface to withdraw the lifting device support from below the ramp.

20. For a dock leveler disposed over a support surface and including a ramp movable between a raised position and a lowered position, a selectively actuable lifting device located below the ramp for selectively moving the ramp to its raised position from its lowered position, and a lifting device support located below the ramp to which the lifting device is mounted, the lifting device support having forward and rear ends, wherein the forward end of the lifting device support is accessible below the ramp from the forward end of the dock leveler, a method of removing the lifting device support from below the ramp, comprising the steps of:

removably and pivotably mounting the rear end of the lifting device support below the ramp via a mounting arrangement in which engagement of the lifting device support is released upon upward movement of the first end of the lifting device support;

mounting one or more wheels toward the forward end of the lifting device support;

raising the forward end of the lifting device support;

positioning one or more second, auxiliary wheels on the lifting device support rearwardly of the first-mentioned wheels, wherein the second wheels are mounted at an elevation below the first-mentioned wheels;

lowering the lifting device support to engage the second wheels with a supporting surface, wherein the first-mentioned wheels are located above the supporting surface;

exerting a downward force toward the forward end of the lifting device support to engage the second wheels with the supporting surface, thereby causing an upward movement of the rearward end of the lifting device support; and removing the lifting device support by exerting a forward force on the lifting device support while maintaining engagement of the second wheels with the supporting surface.

21. The method of claim 20, wherein the lifting device comprises an inflatable member mounted to the lifting device support, such that removal of the lifting device support results in simultaneous removal of the inflatable member.

22. The method of claim 20, wherein the step of removably and pivotably mounting the first end of the lifting device support below the ramp comprises engaging a pin located toward the second end within an upwardly facing recess formed in a depending member extending downwardly from the ramp.

23. The method of claim 20, wherein the step of raising the forward end of the lifting device support comprises engaging a manually operable lifting tool with the forward end of the lifting device support, and moving the lifting tool to an operative lifting position in which a portion of the lifting tool is disposed between the forward end of the lifting device support and the supporting surface, and wherein the step of mounting one or more second wheels to the lifting device support takes place while the lifting device support is raised by maintaining the lifting tool in its operative lifting position.

24. The method of claim 23, wherein the lifting tool comprises a first section engageable with the forward end of the lifting device support, a second section engageable with the supporting surface when the lifting tool is in its operative lifting position, and one or more wheels interposed between the first and second sections of the lifting tool, wherein the step of maintaining the lifting tool in its operative lifting position is carried out by engaging the second portion of the lifting tool with the supporting surface, wherein the first and second sections of the lifting tool are arranged such that engagement of the first second of the lifting tool with the lifting device support is disposed forwardly of the lifting tool wheel while the lifting tool second section is engaged with the supporting surface.

25. The method of claim 20, wherein the step of positioning one or more second wheels to the lifting device support comprises mounting one or more auxiliary wheel assemblies to the lifting device support, each wheel assembly including a mounting plate having a wheel mounted toward its lower end, and removably mounting the mounting plate toward its upper end with the lifting device support.

26. A dock leveler, comprising:

a ramp movable between a raised position and a lowered position;

structure defining a removable mounting slot extending downwardly from the ramp;

an inflatable member for moving the ramp to its raised position from its lowered position;

a support located below the ramp to which the inflatable member is mounted, the support including a pin engageable within the upwardly facing recess and being removable therefrom upon movement of a rear end of the support in an upward direction, the support further including one or more wheels located adjacent a forward end engageable with a supporting surface;

an inflating device mounted to the support and interconnected with the inflatable member for selectively inflating the inflatable member;

wherein the inflatable member, the support and the inflating device are assembled into a lifting subassembly which is supported at its rear end by engagement of the pin within the recess and at its forward end by engagement of the one or more wheels with the supporting surface;

a lifting tool engageable with the forward end of the support for raising the forward end of the support to a raised position by engagement of the lifting tool with the forward end of the support and movement of the lifting tool to an operative position in which a portion of the lifting tool is disposed between the support and the supporting surface, and wherein a portion of the lifting tool is engaged with the supporting surface;

wherein the lifting subassembly is removable by:
  positioning one or more second wheels on the support rearwardly of the first-mentioned wheels, with the second wheels being located at an elevation below that of the first-mentioned wheels;
  lowering the forward end of the support by disengaging the lifting tool from the support forward end to engage the second wheels with a rolling surface, wherein the first-mentioned wheels are elevated above the supporting surface;
  exerting a downward force on the forward end of the support while maintaining engagement of the second wheels with the rolling surface, resulting in upward movement of the support rearward end to disengage the pin from the recess; and exerting a forward force on the support while maintaining the second wheels in engagement with the rolling surface, to draw the support, the inflatable member and the inflating device forwardly.

* * * * *